United States Patent
Huang et al.

(10) Patent No.: US 11,082,636 B2
(45) Date of Patent: Aug. 3, 2021

(54) ELECTRONIC DEVICE AND OPERATING METHOD THEREOF

(71) Applicant: ASUSTeK COMPUTER INC., Taipei (TW)

(72) Inventors: Cheng-Wei Huang, Taipei (TW);
Ten-Long Dan, Taipei (TW);
Chiang-Yi Shen, Taipei (TW);
Hung-Chieh Wang, Taipei (TW);
Wei-Yu Chien, Taipei (TW);
Shih-Yang Liu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/722,173

(22) Filed: Dec. 20, 2019

(65) Prior Publication Data
US 2020/0213531 A1 Jul. 2, 2020

(30) Foreign Application Priority Data
Dec. 26, 2018 (TW) .................................. 107147259

(51) Int. Cl.
*H04N 5/262* (2006.01)

(52) U.S. Cl.
CPC ................................ *H04N 5/2628* (2013.01)

(58) Field of Classification Search
CPC ........ H04N 5/2628; H04N 5/775; H04N 5/85; H04N 9/8042; G11B 27/34; G11B 27/105
USPC ......................................................... 386/230
See application file for complete search history.

(56) References Cited

U.S. PATENT DOCUMENTS

| 8,284,268 | B2 | 10/2012 | Imata |
| 10,319,097 | B2 | 6/2019 | Kuroda et al. |
| 2004/0267122 | A1* | 12/2004 | Nadadur ................ A61B 8/465 600/440 |
| 2009/0135275 | A1* | 5/2009 | Imata ................. H04N 5/23296 348/240.99 |

(Continued)

FOREIGN PATENT DOCUMENTS

| CN | 102438122 A | 5/2012 |
| CN | 103826095 A | 5/2014 |
| CN | 107037962 A | 8/2017 |

(Continued)

*Primary Examiner* — Thai Q Tran
*Assistant Examiner* — Nienru Yang
(74) *Attorney, Agent, or Firm* — McClure, Qualey & Rodack, LLP

(57) ABSTRACT

An electronic device includes a display interface with a first display area and a second display area, a memory and a processor. The memory stores at least one instruction. The processor is coupled to the memory. After loading the program instruction, the processor performs: accessing an image record file with a plurality of original frames; simultaneously displaying the original frames in the first display area and the second display area according to an original scale; detecting whether a first object exists in the image record file; and when the first object is detected in the image record file, displaying a zoom-in image with the first object in the second display area according to a first magnification scale and displaying the original frame corresponding to the zoom-in image in the first display area according to the original scale, wherein the first magnification scale is greater than the original scale.

15 Claims, 10 Drawing Sheets

(56) References Cited

U.S. PATENT DOCUMENTS

2013/0278594 A1* 10/2013 Kaatz .................... G06T 3/4007
　　　　　　　　　　　　　　　　　　　　　　　　　345/419
2017/0116749 A1* 4/2017 Kuroda .................. G06T 7/246

FOREIGN PATENT DOCUMENTS

| EP | 2330557 A1 | 6/2011 |
|----|------------|--------|
| TW | 200939747 A | 9/2009 |
| TW | 201421338 A | 6/2014 |

* cited by examiner

ELECTRONIC DEVICE AND OPERATING METHOD THEREOF

CROSS-REFERENCE TO RELATED APPLICATION

This application claims the priority benefit of Taiwan Application Serial No. 107147259, filed on Dec. 26, 2018. The entirety of the above-mentioned patent application is hereby incorporated by reference herein and made a part of the specification.

BACKGROUND OF THE INVENTION

Field of the Invention

The disclosure relates to an electronic device and operating method thereof.

Description of the Related Art

Some of commercially available web cameras are provided with a dynamic detection function. When detecting that there is an object moving in a target area, a web camera triggers some actions according to settings, including sending a push notification, recording a video, and the like. However, commercially available web cameras are not provided with any additional function for processing or marking during video recording. Consequently, when watching a recorded video file, a user needs to observe changes in images with naked eyes. What's worse, when the user uses a mobile device to watch the video file, the small screen of the mobile device affects user experience.

BRIEF SUMMARY OF THE INVENTION

According to the first aspect of the disclosure, an electronic device is provided. The electronic device comprises: a display interface, comprising a first display area and a second display area; a memory, storing at least one instruction; and a processor, coupled to the memory, and after loading at least one program instruction, the processor performing the following steps: accessing an image record file with a plurality of original frames; simultaneously displaying the original frames in the first display area and the second display area according to an original scale; detecting whether a first object exists in the image record file; and when the first object is detected in the image record file, displaying a zoom-in image with the first object in the second display area according to a first magnification scale and displaying the original frame corresponding to the zoom-in image in the first display area according to the original scale, wherein the first magnification scale is greater than the original scale.

According to the second aspect of the disclosure, an operating method applied to an electronic device with a first display area and a second display area is provided. The operating method comprises following steps: accessing an image record file with a plurality of original frames; simultaneously displaying the original frames in the first display area and the second display area according to an original scale; detecting whether a first object exists in the image record file; and displaying a zoom-in image with the first object in the second display area according to a first magnification scale when the first object is detected in the image record file, and displaying the original frame corresponding to the zoom-in image in the first display area according to the original scale, wherein the first magnification scale is greater than the original scale.

DETAILED DESCRIPTION OF THE EMBODIMENTS

The terms "first", "second", "third", and the like as used herein are used for distinguishing between similar elements or operations and not necessarily for describing a sequence, either temporally, spatially, in ranking or in any other manner or being intended to limit this disclosure.

As used herein, "coupled" or "connected" may mean that two or more components are in direct physical or electrical contact with each other, or are in indirect physical or electrical contact with each other, while "coupled" or "connected" may also mean that two or more components cooperate or interact with each other.

Figure 1:
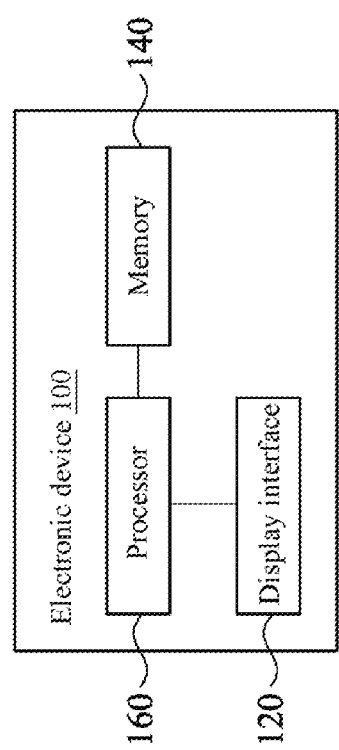
FIG. 1 is a schematic view of an electronic device according to some embodiments of the disclosure.

FIG. 1 is a schematic view of an electronic device according to some embodiments of the disclosure. In an embodiment an electronic device 100 includes a display interface 120, a memory 140 and a processor 160. In some embodiments, the electronic device 100 is a smart phone, a tablet computer, or a notebook computer. In some embodiments, the processor 160 includes but is not limited to a single processing unit or an integration of a plurality of microprocessors, the single processing unit or the integration of microprocessors is electrically coupled to the memory 140, and the memory 140 is an internal memory or external memory such as a transitory or non-transitory memory. In this embodiment, the processor 160 accesses at least one instruction from the memory 140 and executes an application program according the at least one instruction. For ease of understanding, the application program defined by the at least one instruction will be described in detail in the following paragraphs. In some embodiments, the processor 160 is implemented by an integrated circuit. The foregoing implementations of the processor 160 are provided by way of example, and various hardware components such as circuits or modules configured to implement the processor 160 fall within the scope of the disclosure.

In some embodiments, in addition to the at least one instruction, the memory 140 further stores (or temporarily stores) data required for the processor 160 to execute the application program, and stores (or temporarily stores) data generated after the processor 160 executes the application program.

In some embodiments, the display interface 120 is a hardware component in the electronic device 100. In an embodiment, the display interface 120 is a liquid crystal display or an organic light-emitting diode display of the electronic device 100. In some embodiments, the display interface 120 includes software in the electronic device 100. In an embodiment, the display interface 120 includes a program interface displayed through a display of the electronic device 100, for providing an image for the user or providing a function for the user to interact with the electronic device 100.

The foregoing embodiments where the electronic device 100 is a smart phone, a tablet computer, or a notebook computer, which is not limiting the disclosure. In an embodiment, the memory 140 and the processor 160 are disposed in a remote server (not shown), the remote server is communicatively coupled to a mobile device (not shown), and the display interface 120 is a hardware component or a software component in the mobile device. Therefore, the processor 160 in the remote server loads the at least one program instruction to execute the operating method of the disclosure, and transmits the execution result to the display interface 120 for display. Consequently, the electronic device 100 of the disclosure still implements all its functions.

The foregoing implementations of the electronic device 100 are provided by way of example, and other software or hardware components configured to perform the same functions or operations also fall within the scope of the disclosure.

Figure 2:
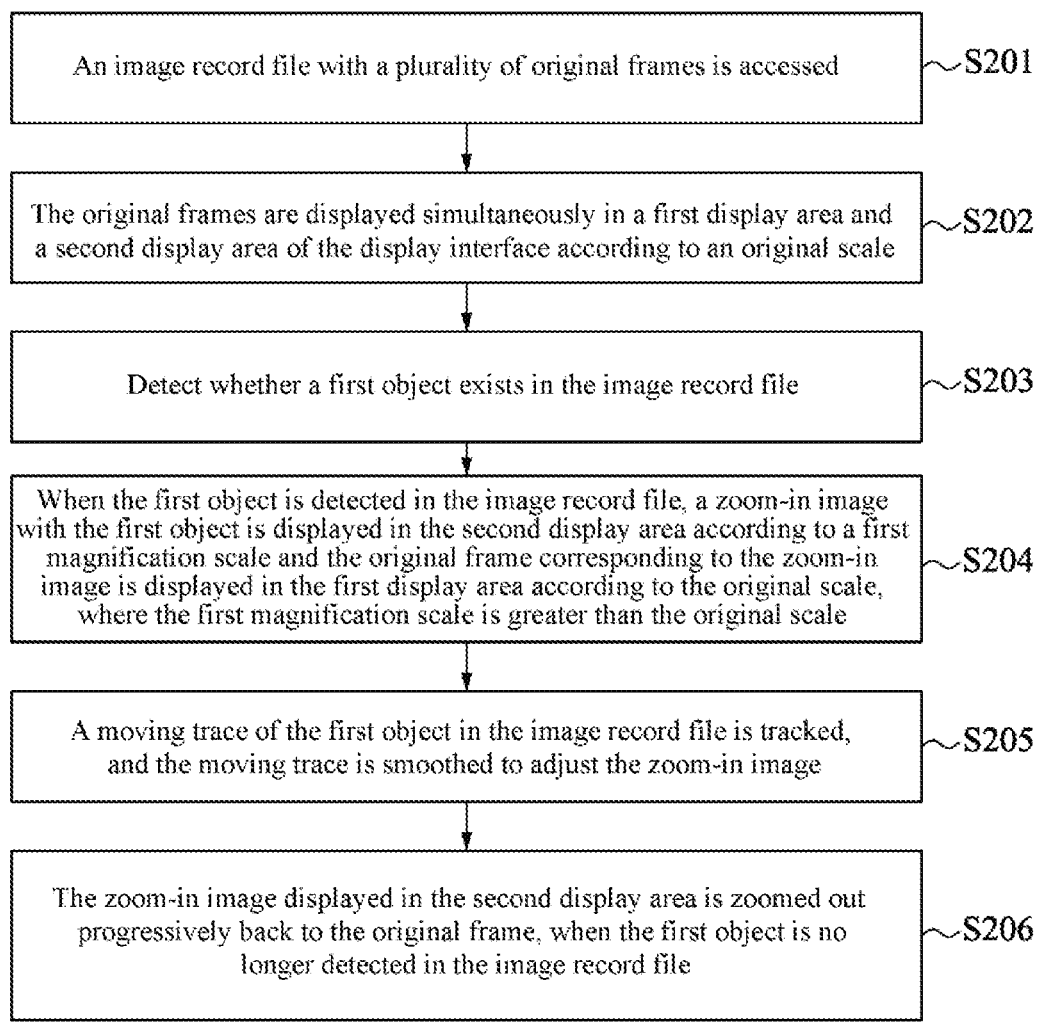
FIG. 2 is a flowchart of an operating method of an electronic device according to some embodiments of the disclosure.

Referring to FIG. 1 and FIG. 2, in an embodiment, an operating method 200 is executed by the electronic device 100 shown in FIG. 1. Specifically, the electronic device 100 loads the foregoing program instruction to execute the operating method 200. The program instruction is stored in a non-transitory computer-readable medium (such as the memory 140). In this embodiment, the steps included in the operating method 200 will be described in detail in the following paragraphs.

Step S201: An image record file with a plurality of original frames is accessed.

Referring to FIG. 1 and FIG. 2, in some embodiments, the processor 160 in the electronic device 100 accesses at least one image record file of one target area from one or more storage devices (such as the memory 140). The image record file has a time span and a plurality of the original frames (Original Frames). The target area is an indoor area or an outdoor area. In an embodiment, an image record file of the target area is captured by a directional web camera disposed in a restaurant lobby, and the time span of the image record file is five hours. Specifically, during the five hours, the directional web camera disposed in the restaurant lobby continuously captures light signals from the restaurant lobby, and the captured light signals are encoded into a particular format by a digital signal processor (DSP), thus generating the image record file.

Step S202: The original frames are displayed simultaneously in a first display area and a second display area of the display interface according to an original scale.

Referring to FIG. 1 and FIG. 2, in some embodiments, the processor 160 in the electronic device 100 displays the original frames of the image record file on the display interface 120.

Figure 3:
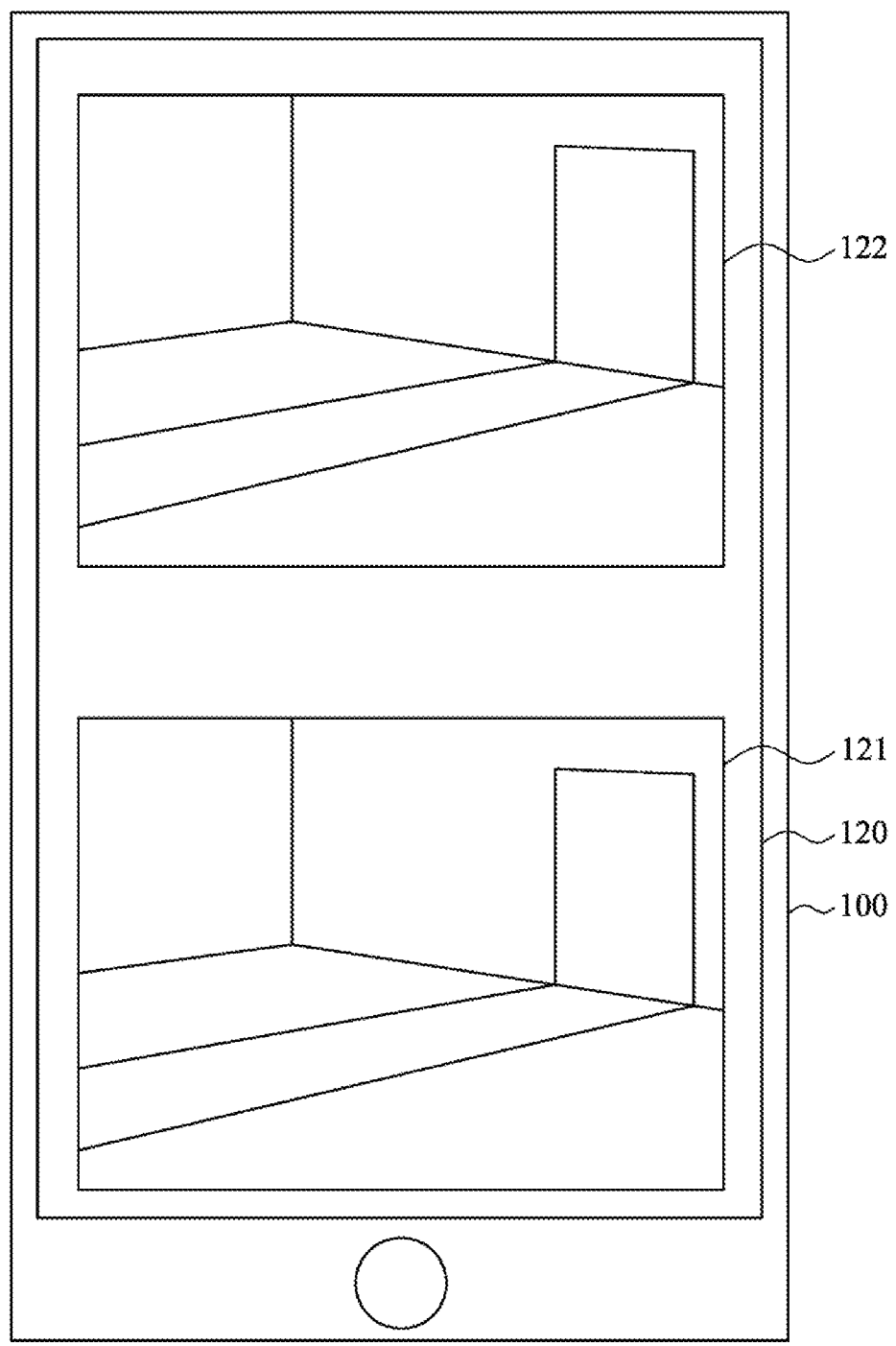
FIG. 3 is a schematic view of a display interface according to some embodiments of the disclosure.

For ease of understanding, referring to FIG. 3 of the disclosure, in some embodiments, the display interface 120 includes a first display area 121 and a second display area 122 of the same size, and the first display area 121 and the second display area 122 are juxtaposed on the display interface 120.

In an embodiment, the processor 160 of the electronic device 100 executes a decoding application program corresponding to the foregoing particular format to read the image record file, and displays the original frames of the image record file on the display interface 120.

As shown in FIG. 3, in the first display area 121 and the second display area 122 of the display interface 120, the same original frame is displayed according to the original scale. In this embodiment, the original scale is a panorama scale. The panorama scale is a scale when the directional web camera captures an image at the shortest focal length, that is, a minimum magnification scale supported by the directional web camera (in an embodiment, the magnification scale is represented as 1×). At the shortest focal length, the directional web camera captures the original frames with a wide range in the target area (such as the restaurant lobby).

In other embodiments of the disclosure, the original scale is adjusted as required. In some embodiments, the original scale is a value, between the longest focal length and the shortest focal length, of the adjustable focal length of the directional web camera.

Step S203: Whether a first object exists in the image record file is detected.

Referring to FIG. 1 and FIG. 2, in some embodiments, the processor 160 of the electronic device 100 includes an object detection (Object Detection) application program. After the processor 160 accesses the image record file, the processor 160 reads original frames in the at least one image record file through the object detection application program to perform object detection. In some embodiments, after accessing the image record file, the processor 160 continuously monitors pixel values of the original frames in the image record file, and detects an object according to a change in pixel values of adjacent original frames in the image record file. In an embodiment, the term "adjacent" mentioned herein refers to an adjacent relationship between the original frames based on a timeline. In some embodiments, the object that the processor 160 mainly tracks is a human face. In other embodiments, the processor 160 is further configured to track a non-human object.

It should be understood that, because the image record file is captured by the directional web camera, a background environment of the restaurant lobby does not change too much or too often during the overall time span of the image record file. In an embodiment, when a significant and continuous pixel change is detected between adjacent original frames of the image record file, it is determined that the pixel change corresponds to movement of an object.

Figure 4:
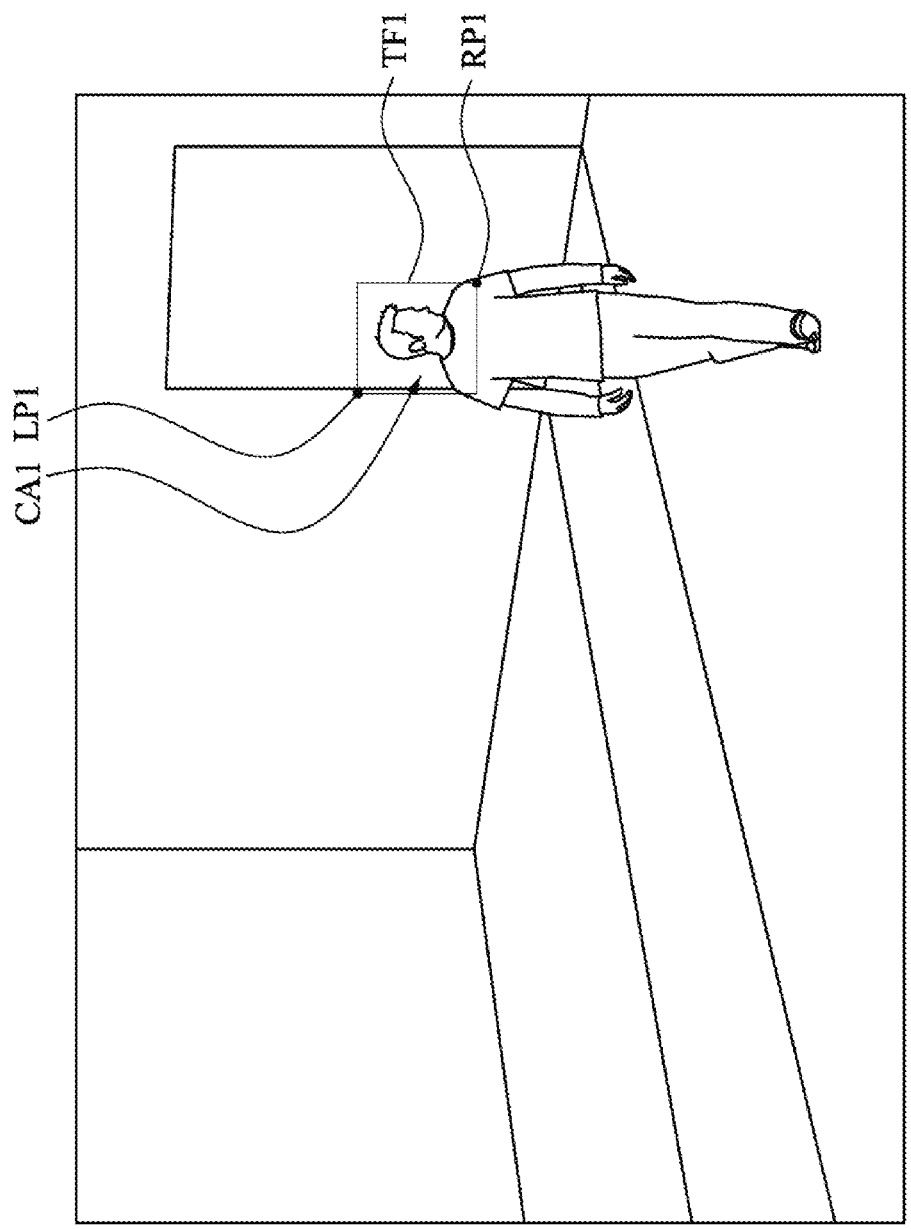
FIG. 4 is a schematic view of an object detection scenario according to some embodiments of the disclosure.

For ease of understanding, refer to FIG. 4 of the disclosure, which is a schematic view of an object detection scenario according to some embodiments of the disclosure. In an embodiment, the processor 160 detects a significant pixel change between a plurality of adjacent original frames of the image record file, and performs face recognition in the area corresponding to the significant pixel change, to define a first range CA1 (as shown in FIG. 4) including a face. The processor 160 determines that the first range CA1 corresponds to a first object. In this embodiment, the first object is a face of a first person. In particular, when all pixels corresponding to every original frame (that is, every frame) in the at least one image record file are considered as a plane coordinate system, in the foregoing embodiment, the processor 160 detects that a pixel change occurs in the first range CA1 at the right side of the plane coordinate system. As shown in FIG. 4, the processor 160 marks an upper left corner point LP1 at a coordinate point at the upper left corner of the first range CA1, and marks a lower right corner point RP1 at a coordinate point at the lower right corner of the first range CA1. The upper left corner point LP1 and the lower right corner point RP1 define a first tracking frame TF1 which is rectangular, and the first tracking frame TF1 is configured to track a pixel change in the first range CA1. In addition, a center point CP1 of the first tracking frame TF1 is marked according to the upper left corner point LP1 and the lower right corner point RP1.

Step S204: When the first object is detected in the image record file, a zoom-in image with the first object is displayed in the second display area according to a first magnification scale and the original frame corresponding to the zoom-in image is displayed in the first display area according to the original scale, where the first magnification scale is greater than the original scale.

Referring to FIG. 1 and FIG. 2, in some embodiments, when the processor 160 in the electronic device 100 determines that there is an object moving in the image record file, the processor 160 displays a zoom-in image corresponding to the object in the second display area 122 of the display interface 120.

Figure 5:
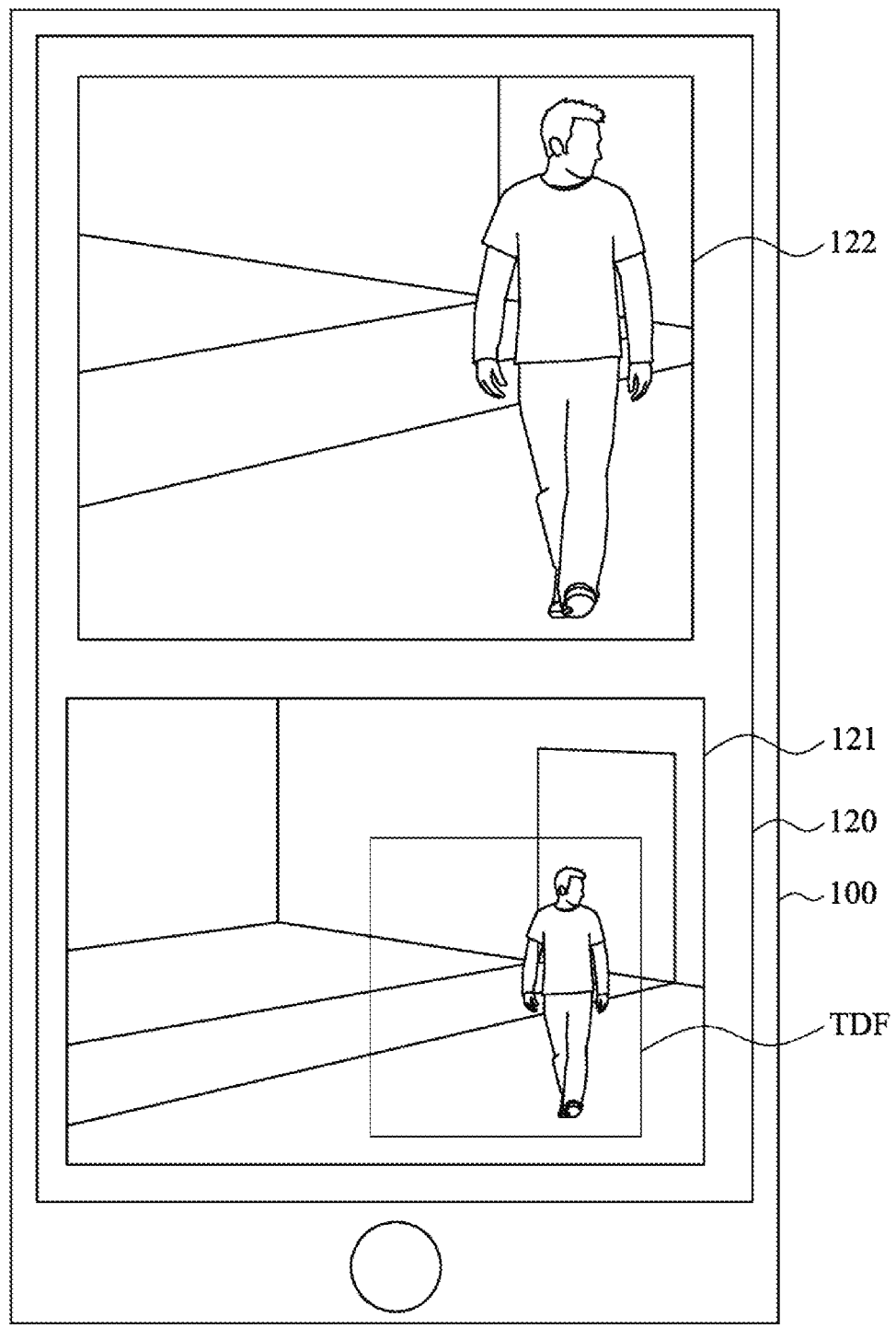
FIG. 5 is a schematic view of a display interface according to some embodiments of the disclosure.

For ease of understanding, refer to FIG. 5 of the disclosure, which is a schematic view of a display interface according to some embodiments of the disclosure. As shown in FIG. 5, in some embodiments, when the processor 160 detects the pixel change in the first range CA1 as shown in FIG. 4 in consecutive original frames, the processor 160 displays the zoom-in image with the first object in the second display area 122 according to the first magnification scale. In particular, in an embodiment, the processor 160 selects an area with the first object in the consecutive original frame as a tracking display frame TDF and zooms in an image in the tracking display frame TDF to obtain a zoom-in image, and displays the zoom-in image in the second display area 122, as shown in FIG. 5. In an embodiment, the tracking display frame TDF is defined by using the first tracking frame TF1 shown in FIG. 4 as the center and extending outward by a distance according to the first magnification scale.

In some embodiments, when the processor 160 displays a zoom-in image of the first object in the second display area 122 according to the first magnification scale at a playing time point, the processor 160 still displays an original frame in the first display area 121 according to the original scale at the same playing time point. In some embodiments, the processor 160 further marks a position of the tracking display frame TDF in an image of the restaurant lobby displayed in the first display area 121. In an embodiment, the processor 160 displays the tracking display frame TDF as a red rectangle in the first display area 121. In this way, the electronic device 100 displays a contrast between panoramic and partial magnification by using the first display area 121 and the second display area 122 of the display interface 120, so that it is convenient for reading images of the restaurant lobby.

As described above, in some embodiments, the original scale is a scale when the directional web camera captures an image at the shortest focal length, that is, a minimum magnification scale (in an embodiment, the magnification scale corresponding to the original scale is represented as 1×). Therefore, in this embodiment, the first magnification scale is greater than the original scale. In an embodiment, the first magnification scale is represented as 2.2×. It should be understood that, the values of the original scale and the first magnification scale are merely used for describing but not limiting the disclosure. It is feasible to set the original scale and the first magnification scale to other values according to requirements of the user or a system. In some embodiments, when the processor 160 determines a size of the first tracking frame TF1, the processor 160 determines the size of the tracking display frame TDF according to a ratio of the size of the first tracking frame TF1 to a size of the entire target area (that is, the restaurant lobby), and displays the image in the first tracking frame TF1 into the second display area 122.

In some embodiments, when the processor 160 detects a pixel change of the first range CA1 in the at least one image record file at a playing time point, and determines that the first range CA1 corresponds to the first object, the processor 160 progressively switches from the original scale to the first magnification scale to display the image with the first object in the second display area 122. In an embodiment, when the processor 160 detects a pixel change of the first range CA1 in the at least one image record file at a playing time point 10'10", the processor 160 linearly switches from the magnification scale of 1× to the magnification scale of 2.2× in the second display area 122 between the playing time point 10'09" and the playing time point 10'10". Through the progressive zoom-in procedure, a zoom effect similar to camera movement is produced to avoid abruptly changes of frame. It should be understood that, the foregoing values are not intended to limit the disclosure, and it is also feasible to implement the progressive zoom-in procedure using other feasible values according to requirements of the user or the system.

Step S205: A moving trace of the first object in the image record file is tracked, and the moving trace is smoothed to adjust the zoom-in image.

As described above, in some embodiments, when accessing the at least one image record file, the processor 160 continuously monitors pixel values in the entire time span of the at least one image record file to perform object detection. In the embodiment shown in FIG. 4, when detecting a pixel change at an edge of the restaurant lobby of the first range CA1, the processor 160 determines that the first range CA1 corresponds to the first object. In some embodiments, the processor 160 continuously monitors the pixel change in the first range CA1 during a particular time period (such as 10 milliseconds), until the pixel change in the first range CA1 is out of the target area such as the restaurant lobby. In this way, the processor 160 tracks the moving trace of the first object in the target area. It should be understood that, it is feasible to set the time interval to other feasible values according to requirements of the user or the system.

In some embodiments, in the at least one image record file, the pixel change of the first range CA1 in the original frame is detected by the processor 160 at a first playing time point, and there is no pixel change of the first range CA1 in the original frame is detected by the processor 160 at a second playing time point. That is, the first object moves in the target area between the first playing time point and the second playing time point. In this embodiment, the processor progressively zooms in a partial image in the first range CA1 and displays the zoom-in partial image in the second display area 122 before the first playing time point. Starting from the first playing time point, the processor 160 displays a zoom-in image of the first range CA1 and a surrounding area thereof in the second display area 122 according to the first magnification scale. From the first playing time point to the second playing time point, the processor 160 calculates a coordinate position of the center point CP1 of the first tracking frame TF1 corresponding to the original frame in a particular time interval (in an embodiment, every 10 milliseconds), and continuously records movement of the center point CP1 in a duration between the two playing time points. In this way, the processor 160 tracks the moving trace of the first object in the target area, and displays the moving trace in the second display area 122.

However, in some embodiments, when the first object of the first range CA1 moves, the relative position of the first object in the original frame varies in height (in an embodiment, a person moves up and down relative to the ground during walking). When a zoom-in image with the moving trace of the first object is directly displayed in the second display area 122, an abruptly change of frame is caused. Therefore, in some embodiments, the processor 160 in the electronic device 100 includes a trace smoothing application program, which is configured to smooth the moving trace of the object. In some embodiments, the processor 160 calculates and records a plurality of coordinate positions of the center point CP1 of the first tracking frame TF1 corresponding to the original frames in a particular time interval. The processor 160 further processes the coordinate positions corresponding to the center point CP1 by using a polyline smoothing algorithm.

Figure 6A:
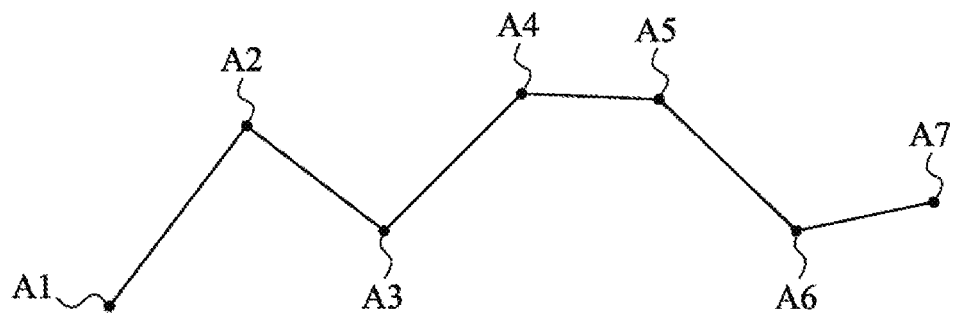
FIG. 6A is a schematic view of a smoothing algorithm procedure according to some embodiments of the disclosure.
Figure 6B:
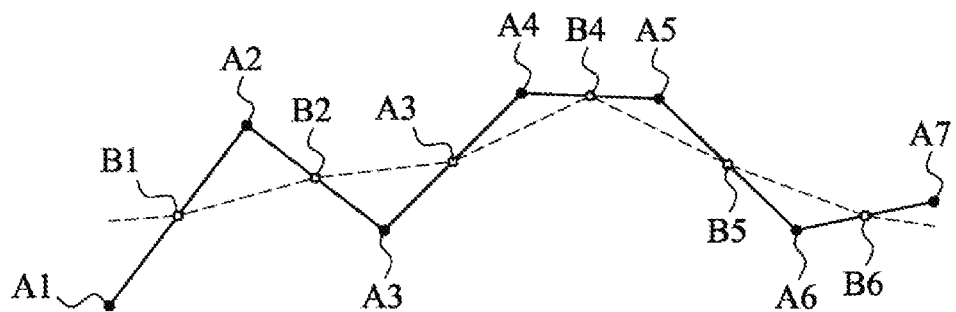
FIG. 6B is a schematic view of a smoothing algorithm procedure according to some embodiments of the disclosure.

For ease of understanding, refer to FIG. 6A and FIG. 6B of the disclosure, which are each a schematic view of a smoothing algorithm procedure according to some embodiments of the disclosure. As shown in FIG. 6A, in some embodiments, position points A1 to A7 represent the coordinate positions of the center point CP1 of the first tracking frame TF1 in the original frames at seven consecutive playing time points. The moving trace formed by connecting the position points A1 to A7 is fluctuating. As shown in FIG. 6B, in some embodiments, the processor 160 selects two adjacent position points from the position points A1 to A7 shown in FIG. 6A, and calculates a midpoint (such as midpoints B1 to B6 shown in FIG. 6B) between every two position points, and further connects the midpoints between the position points to obtain a new moving trace. In this way, the processor 160 smoothes the moving trace of the first object. In this embodiment, between the first playing time point and the second playing time point, the processor 160 displays a zoom-in image with the smoothed moving trace of the first object in the second display area 122 according to the first magnification scale, thus optimizing the camera movement effect, and improving user experience.

It should be noted that, the foregoing embodiment is not intended to limit the disclosure, and in other embodiments, the smoothing algorithm procedure executed by the processor 160 is implemented according to other smoothing technologies. In addition, the processor 160 further executes the smoothing algorithm multiple times to obtain a desirable smooth moving trace. In some embodiments, the processor 160 implements the polyline smoothing algorithm again on the midpoints B1 to B6 shown in FIG. 6B, to obtain a new moving trace formed by five points.

Step S206: The zoom-in image displayed in the second display area is zoomed out progressively back to the original frame, when the first object is no longer detected in the image record file.

As described above, in some embodiments, the processor 160 continuously monitors pixel values of the at least one image record file in the entire time span of the image record file to perform object tracking. In the embodiments shown in FIG. 4 and FIG. 5, the first object moves in the target area in a duration between the first playing time point and the second playing time point and there is no pixel change of the first range CA1 in the original frame is detected by the processor 160 at the second playing time point. In this embodiment, at the second playing time point, the processor 160 still displays an image of the first range CA1 and a surrounding area thereof in the second display area 122 (that is, an image in the range of the tracking display frame TDF) according to the first magnification scale. Starting from the playing time point next to the second playing time point, the processor 160 progressively switches from the first magnification scale to the original scale in the second display area 122 to display the original frame of the entire target area, thus avoiding abruptly changes of frame. It should be understood that, in some embodiments, in the process from the appearance to disappearance of the first range CA1 with the first object in the target area, the processor 160 correspondingly displays the movement of the tracking display frame TDF in the original frame in the first display area 121 according to the moving trace of the center point CP1 of the first tracking frame TF1.

Figure 7:
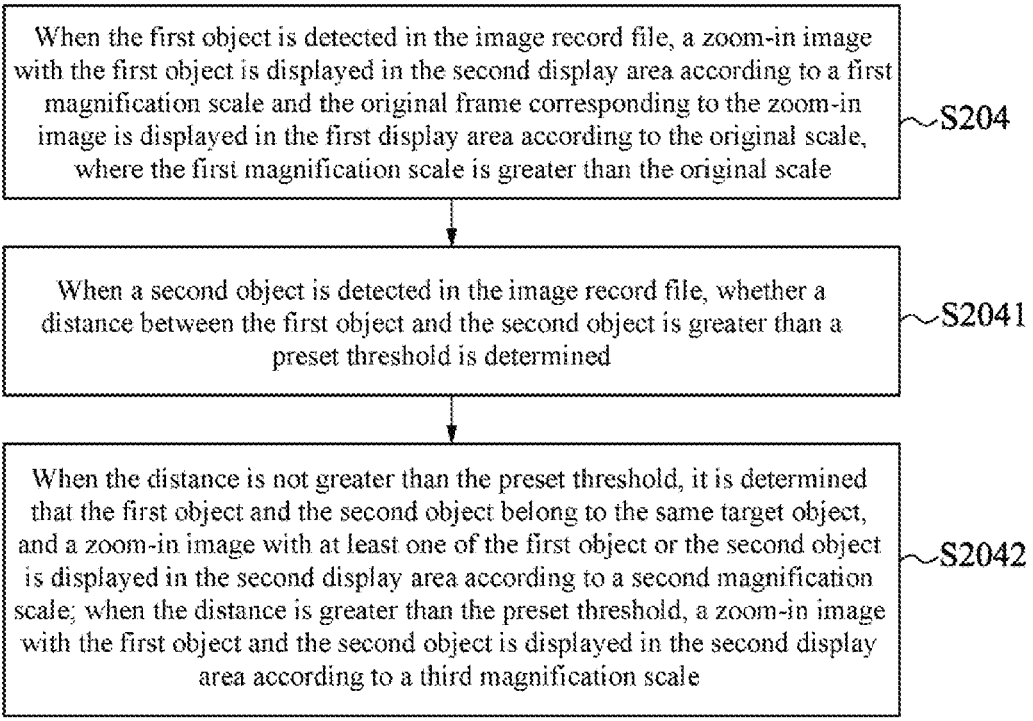
FIG. 7 is a flowchart of an operating method of an electronic device according to some embodiments of the disclosure.

Referring to FIG. 7, in some embodiments, the operating method 200 further includes steps 2041 and 2042 after step 204.

Step S2041: When a second object is detected in the image record file, whether a distance between the first object and the second object is greater than a preset threshold is determined.

It should be understood that, in some embodiments, the original frame of the target area (such as the restaurant lobby) includes multiple ranges with pixel change, it means that there are two or more moving objects in the target area. In this case, the processor 160 executes a determining algorithm to determine whether the forgoing ranges with pixel change actually represent that there are two or more moving objects in the target area. In an embodiment, when the processor 160 detects that two or more ranges with pixel change exist in the original frames at the same playing time point, the processor 160 calculates a relative distance between the foregoing ranges with pixel change in the original frame, determines whether the distance exceeds a preset threshold to determine whether there are two or more moving objects in the target area.

Figure 8:
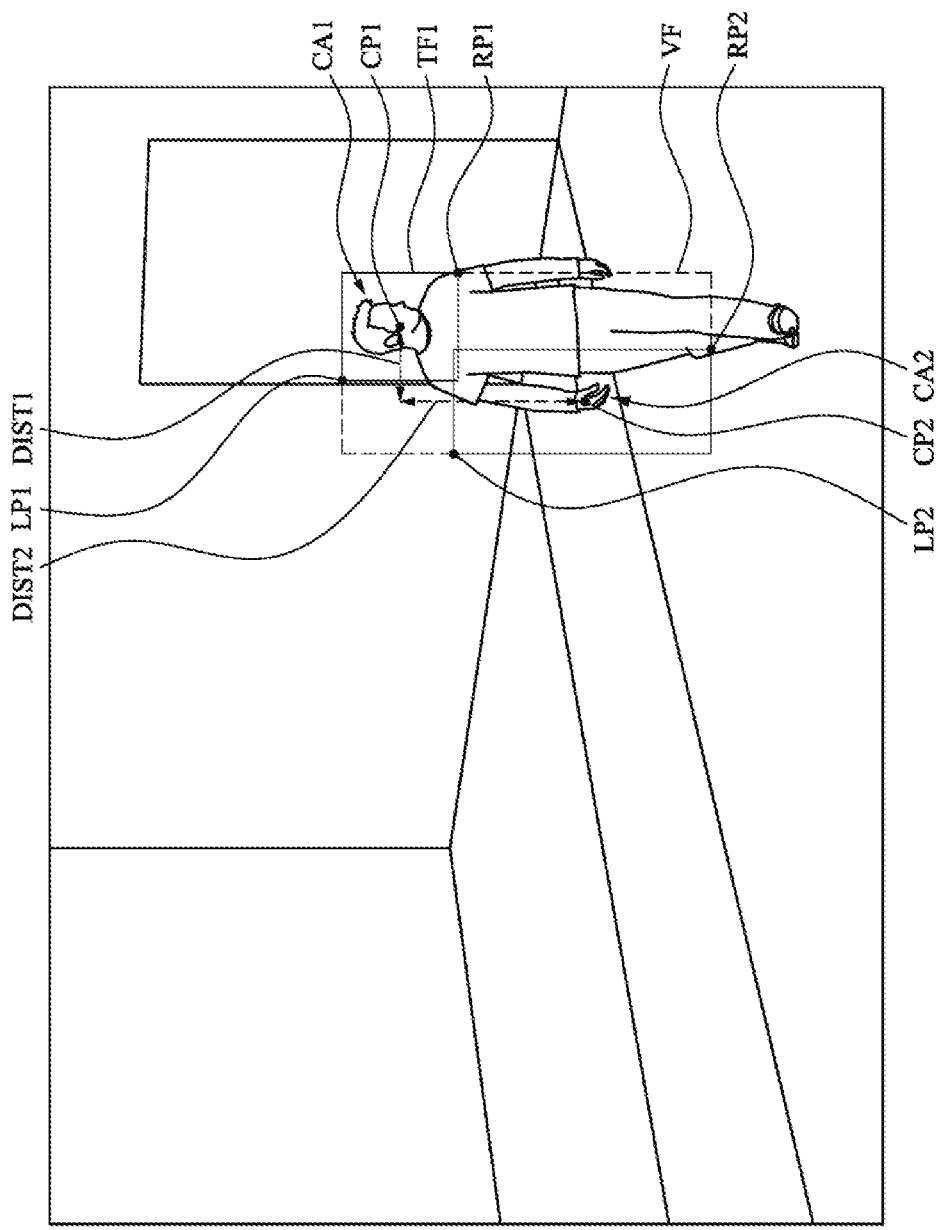
FIG. 8 is a schematic view of a determining algorithm procedure according to some embodiments of the disclosure.

For ease of understanding, refer to FIG. 8 of the disclosure, which is a schematic view of a determining algorithm procedure according to some embodiments of the disclosure. It should be understood that, FIG. 8 of the disclosure is related to FIG. 4, so reference is also made to FIG. 4. As described above, as described in the embodiment in FIG. 4, at the first playing time point in the time span, when the processor 160 determines a significant pixel change occurs at an edge of the restaurant lobby of the original frames, the processor 160 defines the range of the significant pixel change as the first range CA1 and determines that the first range CA1 corresponds to the first object. Therefore, the processor 160 acquires an upper left corner point LP1 and a lower right corner point RP1 to generate the first tracking frame TF1 to track the pixel change in the first range CA1. As shown in FIG. 8, at the third playing time point which is later than the first playing time point in the time span, the processor 160 detects another pixel change at a position close to the first range CA1 in the original frames, where the another pixel change corresponds to a second range CA2. In this embodiment, the second range CA2 corresponds to a hand of the first person. In FIG. 4 in an embodiment, the processor 160 acquires an upper left corner point LP2 and a lower right corner point RP2 to generate a second tracking frame TF2 to track the pixel change in the second range CA2. Likewise, the processor 160 acquires a center point CP2 of the second tracking frame TF2 according to the upper left corner point LP2 and the lower right corner point RP2.

In this embodiment, the processor 160 executes the determining algorithm to calculate a horizontal distance DIST1 and a perpendicular distance DIST2 between the center point CP1 of the first tracking frame TF1 and the center point CP2 of the second tracking frame TF2 in the original frames.

In some embodiments, the processor 160 determines whether at least one of the horizontal distance DIST1 or the perpendicular distance DIST2 is greater than a preset threshold. In some embodiments, the eight corner points of the first tracking frame TF1 and the second tracking frame TF2 form a large virtual frame VF, and the preset threshold corresponding to the horizontal distance is set to half a width of the virtual frame VF or the preset threshold corresponding to the perpendicular distance is set to half a height of the virtual frame VF.

In some embodiments, the processor 160 determines whether another distance (such as a root mean square of the horizontal distance DIST1 and the perpendicular distance DIST2 in an embodiment) is greater than the preset threshold by the horizontal distance DIST1 and the perpendicular distance DIST2. In some embodiments, the eight corner points of the first tracking frame TF1 and the second tracking frame TF2 form a large virtual frame VF, the preset threshold is set to half a width of a diagonal of the virtual frame VF.

Step S2042: When the distance is not greater than the preset threshold, it is determined that the first object and the second object belong to the same target object, and a zoom-in image with at least one of the first object or the second object is displayed in the second display area according to a second magnification scale; when the distance is greater than the preset threshold, a zoom-in image with the first object and the second object is displayed in the second display area according to a third magnification scale.

As shown in FIG. 8, in an embodiment), because the horizontal distance DIST1 and the perpendicular distance DIST2 are both not greater than the preset threshold, the processor 160 determines that the first range CA1 and the second range CA2 belong to the same target object (that is, the first person). The processor 160 displays, a zoom-in image with at least one of the first tracking frame TF1 of the first range CA1) or the second tracking frame TF2 of the second range CA2 in the second display area 122.

As described above, in some embodiments, the processor 160 is mainly configured to track a face. Because the processor 160 displays the zoom-in image with at least one of the first range CA1 or the second range CA2 in the second display area 122, the processor 160 selects the first tracking frame TF1 with a high perpendicular coordinate value as a main tracking frame of the first person, and tracks the movement of the first range CA1 corresponding to the face of the first person in the second display area 122. As shown in FIG. 5, the processor 160 displays the image with the face of the first person in the second display area 122 according to the first magnification scale. It should be understood that, in some other embodiments, under different requirements of the user or the system, the processor 160 displays a zoom-in image of the first person in the second display area 122 according to a second magnification scale that is less than or equal to the first magnification scale, so as to cover the face, hands, or the entire body of the first person.

Figure 9:
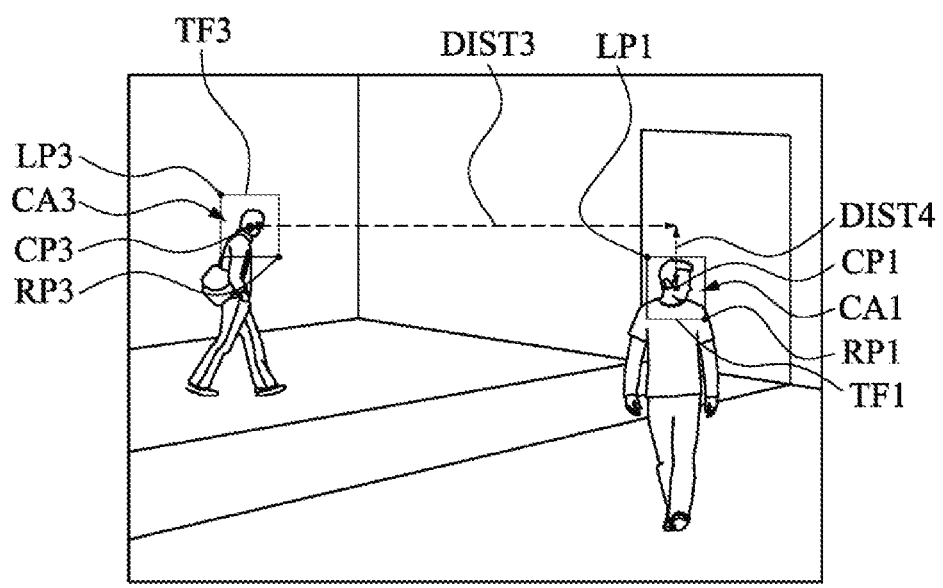
FIG. 9 is a schematic view of a determining algorithm procedure according to some embodiments of the disclosure.

In some embodiments, the distance between the first object and the second object in the image record file is greater than the preset threshold. Refer to FIG. 4 and FIG. 9. As described in the embodiment in FIG. 4, at the first playing time point in the time span, the processor 160 detects a pixel change in the first range CA1 corresponding to an edge of the restaurant lobby of the original frames, and tracks the first object of the first range CA1 according to the first tracking frame TF1. As shown in FIG. 9, at the third playing time point which is later than the first playing time point in the time span, the processor 160 detects another pixel change at another edge of the restaurant lobby according to the original frames, where the another pixel change corresponds to a third range CA3 in the original frame. In this embodiment, the third range CA3 corresponds to a second person. Similar to the embodiment shown in FIG. 4, corresponding to the third range CA3, the processor 160 acquires an upper left corner point LP3 and a lower right corner point RP3 to generate a third tracking frame TF3 to track the pixel change in the third range CA3. Likewise, the processor 160 acquires a center point CP3 of the third tracking frame TF3.

In this embodiment, the processor 160 executes a determining algorithm to calculate a horizontal distance DIST3 and a perpendicular distance DIST4 between the center point CP1 of the first tracking frame TF1 and the center point CP3 of the third tracking frame TF3, and determines whether the horizontal distance DIST3 and the perpendicular distance DIST4 are greater than a preset threshold. In this embodiment, the preset threshold corresponding to the horizontal distance is 45% of the width of the target area, and the preset threshold corresponding to the perpendicular distance is 80% of the height of the target area.

In this embodiment, when the horizontal distance DIST3 is greater than the preset threshold corresponding to the horizontal distance or the perpendicular distance DIST4 is greater than the preset threshold corresponding to the perpendicular distance, the processor 160 determines that the first range CA1 and the third range CA3 do not belong to the same target object. In this embodiment, because the horizontal distance DIST3 is greater than the preset threshold corresponding to the horizontal distance, the processor 160 determines that the first range CA1 and the third range CA3 do not belong to the same target object, but respectively correspond to the first person and the second person. In this way, the processor 160 actually identifies movements of different target objects in the original frames of the image record file. It should be understood that, the foregoing embodiment is not intended to limit the disclosure, and the preset threshold used by the processor 160 to execute the determining algorithm varies with different requirements of the user or the system.

Figure 10:
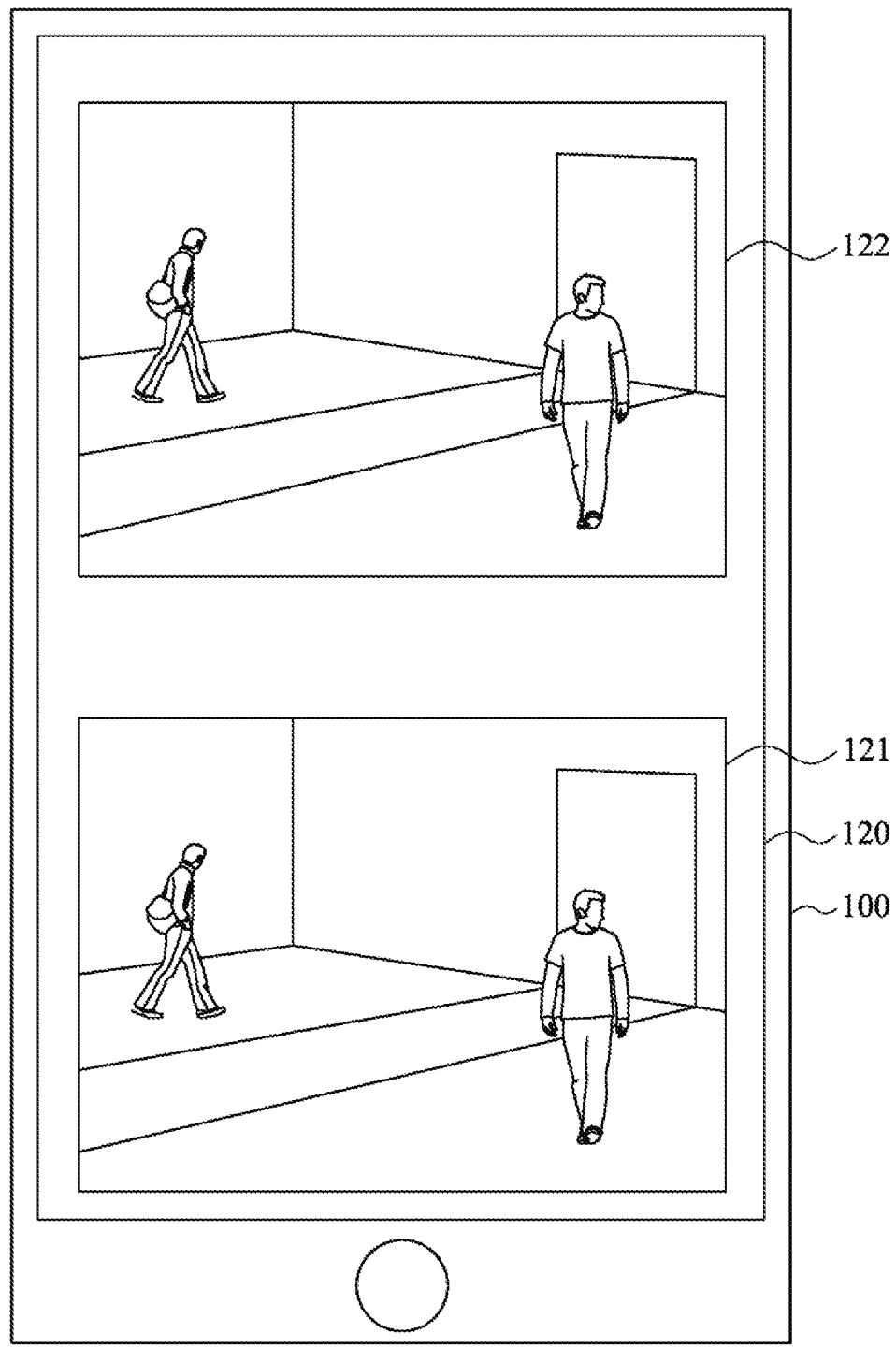
FIG. 10 is a schematic view of a display interface according to some embodiments of the disclosure.

In some embodiments, when the processor 160 identifies the movements of the first person and the second person in the target area, the processor 160 displays the movements of the two persons in the display interface 120. For ease of understanding, refer to FIG. 10 of the disclosure, which is a schematic view of a display interface according to some embodiments of the disclosure. As shown in FIG. 10, in some embodiments, the processor 160 displays the original frame of the entire target area in the first display area 121 of the display interface 120 according to the original scale, and displays the zoom-in image in the target area in the second display area 122 of the display interface 120 according to the third magnification scale, so as to simultaneously display movements of the two persons in the display interface 120. As shown in FIG. 10, in this embodiment, the third magnification scale is equal to the original scale. In some embodiments, the third magnification scale is greater than or equal to the original scale and less than the first magnification scale. In an embodiment, when the original scale is 1× and the first magnification scale is 2.2×, the third magnification scale is 1.1×, which is slightly greater than the original scale and less than the first magnification scale. The foregoing values of the first magnification scale to the third magnification scale are provided by way of example only, and other values also fall within the scope of the disclosure.

It should be understood that, in some embodiments, the processor 160 displays the original frame of the entire target area in the first display area 121 of the display interface 120 according to the original scale, and marks the positions of the first tracking frame TF1 and the third tracking frame TF3 in the original frame displayed in the first display area 121. In this way, when the third magnification scale used in the second display area 122 is close to or equal to the original scale, the users intuitively identifies the movements of the first person and the second person in the first display area 121.

Likewise, in this embodiment, the processor 160 continuously tracks the movements of the first person and the second person in the target area (the restaurant lobby), and smoothes the moving trajectories of the first tracking frame TF1 and the third tracking frame TF3 by using a method similar to that in the embodiment shown in FIG. 6A and FIG. 6B, until the first person or the second person leaves the target area (that is, the pixel change corresponding to the first person or the second person is no longer detected in the target area). In an embodiment, when the processor 160 detects the first person leaves the target area and the second person is still in the target area at the second playing time point, the processor 160 continuously tracks the movement of the second person in the target area, displays a zoom-in image of the movement of the second person in the second display area 122 according to a fourth magnification scale, and marks the position of the third tracking frame TF3 in the original frame of the first display area 121.

In an embodiment, the memory 140 is a non-transitory computer-readable medium. The memory 140 stores at least one instruction, and the processor 160 accesses the at least one instruction to perform steps S201 to S206 in the operating method 200 of an electronic device. Reference is made to the foregoing embodiments for details, which will not be described herein again.

According to the foregoing embodiments, the disclosure provides an electronic device, an operating method thereof, and a non-transitory computer-readable medium. With the technology of the disclosure, an image of a moving object and a surrounding area thereof is properly zoomed and displayed, to track the moving object in the image record file in a manner similar to camera movement. In addition, a panoramic image of the target area is used as a comparison image in the disclosure to improve user experience when the user views the image record file, making the electronic device and operating method thereof effective and intuitive.

Although the disclosure is disclosed as above by using embodiments, the embodiments are not intended to limit the disclosure. A person skilled in the art makes various variations and improvements without departing from the spirit and scope of the disclosure. Therefore, the protection scope of the disclosure should be subject to the appended claims.

What is claimed is:

1. An electronic device, comprising:
 a display interface, comprising a first display area and a second display area;
 a memory, storing at least one instruction; and
 a processor, coupled to the memory, and after loading at least one program instruction, the processor performing the following steps:
 accessing an image record file with a plurality of original frames;
 simultaneously displaying the original frames in the first display area and the second display area according to an original scale;
 detecting whether a first object exists in the image record file;
 linearly and progressively zooming in the original frame displayed in the second display area in a zoom-in frequency to display the zoom-in image in the second display area according to the first magnification scale when the first object is detected in the image record file, and displaying the original frame corresponding to the zoom-in image in the first display area according to the original scale, wherein the first magnification scale is greater than the original scale;
 tracking a moving trace of a plurality of pixels corresponding to the first object in the image record file;
 smoothing the moving trace, and display a smoothed moving trace between each of a plurality of playing time points in the second display area according to the first magnification scale to adjust the zoom-in image, wherein the plurality of playing time points are a plurality of time points among an overall time span of playing the plurality of original frames of the image record file; and
 marking an area corresponding to the zoom-in image in the original frame displayed in the first display area when the second display area displays the zoom-in image and the first display area displays the original frame at a same time.

2. The electronic device according to claim 1, wherein the processor is further configured to perform the following step:
 progressively zooming in the original frame displayed in the second display area, to obtain the zoom-in image according to the first magnification scale when the first object is detected in the image record file.

3. The electronic device according to claim 2, wherein the processor is further configured to perform the following step:
 progressively zooming out the zoom-in image displayed in the second display area back to the original frame according to the original scale when the first object is no longer detected in the image record file.

4. The electronic device according to claim 1, wherein the processor is further configured to perform the following steps:
 determining whether a distance between the first object and a second object is greater than a preset threshold when detecting that the second object is moving in the image record file; and
 determining that the first object and the second object belong to the same target object when the distance is not greater than the preset threshold, and displaying a zoom-in image with at least one of the first object or the second object in the second display area according to a second magnification scale, wherein the second magnification scale is greater than the original scale.

5. The electronic device according to claim 4, wherein the processor is further configured to perform the following step:
displaying a zoom-in image with the first object and the second object in the second display area according to a third magnification scale when the distance is greater than the preset threshold, wherein the third magnification scale is less than the first magnification scale.

6. The electronic device according to claim 5, wherein the third magnification scale is greater than or equal to the original scale.

7. The electronic device according to claim 4, wherein the processor is further configured to perform the following step:
displaying a zoom-in image with the second object in the second display area according to a fourth magnification scale when the second object is detected but the first object is not detected in the image record file, wherein the fourth magnification scale is greater than the original scale.

8. The electronic device according to claim 1, wherein the first display area and the second display area are of a same size and are juxtaposed in the display interface.

9. An operating method, applied to an electronic device, wherein the electronic device comprises a first display area and a second display area, and the operating method comprises:
accessing an image record file with a plurality of original frames;
simultaneously displaying the original frames in the first display area and the second display area according to an original scale;
detecting whether a first object exists in the image record file;
linearly and progressively zooming in the original frame displayed in the second display area in a zoom-in frequency to display the zoom-in image in the second display area according to the first magnification scale when the first object is detected in the image record file, and displaying the original frame corresponding to the zoom-in image in the first display area according to the original scale, wherein the first magnification scale is greater than the original scale;
tracking a moving trace of a plurality of pixels corresponding to the first object in the image record file;
smoothing the moving trace, and display a smoothed moving trace between each of a plurality of playing time points in the second display area according to the first magnification scale to adjust the zoom-in image, wherein the plurality of playing time points are a plurality of time points among an overall time span of playing the plurality of original frames of the image record file; and
marking an area corresponding to the zoom-in image in the original frame displayed in the first display area when the second display area displays the zoom-in image.

10. The operating method according to claim 9, wherein the step of displaying a zoom-in image with the first object in the second display area according to a first magnification scale further comprises:
progressively zooming in the original frame displayed in the second display area, to form the zoom-in image according to the first magnification scale.

11. The operating method according to claim 10, wherein the step of operating method further comprises the following step:
progressively zooming out the zoom-in image displayed in the second display area back to original frame according to the original scale, when the first object is no longer detected in the image record file.

12. The operating method according to claim 9, wherein the step of operating method further comprises the following steps:
determining whether a distance between the first object and the second object is greater than a preset threshold when a second object is detected moving in the image record file; and
determining that the first object and the second object belong to the same target object when the distance is not greater than the preset threshold, and displaying a zoom-in image with at least one of the first object or the second object in the second display area according to a second magnification scale, wherein the second magnification scale is greater than the original scale.

13. The operating method according to claim 12, wherein the step of operating method further comprises the following step:
displaying a zoom-in image with the first object and the second object in the second display area according to a third magnification scale when the distance is greater than the preset threshold, wherein the third magnification scale is less than the first magnification scale.

14. The operating method according to claim 13, wherein the third magnification scale is greater than or equal to the original scale.

15. The operating method according to claim 12, wherein the operating method further comprises the following step:
displaying a zoom-in image with the second object in the second display area according to a fourth magnification scale when the second object is detected but the first object is not detected in the image record file, wherein the fourth magnification scale is greater than the original scale.

* * * * *